(12) United States Patent
Bonawitz et al.

(10) Patent No.: US 8,775,358 B2
(45) Date of Patent: Jul. 8, 2014

(54) METHOD AND APPARATUS FOR PERFORMING PROBABILISTIC INFERENCE AND PROVIDING RELATED SOLUTION METHODS

(75) Inventors: Keith Bonawitz, Cambridge, MA (US); Vikash Mansinghka, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 1319 days.

(21) Appl. No.: 12/276,956

(22) Filed: Nov. 24, 2008

(65) Prior Publication Data

US 2009/0144218 A1    Jun. 4, 2009

Related U.S. Application Data

(60) Provisional application No. 60/991,578, filed on Nov. 30, 2007.

(51) Int. Cl.
*G06F 9/44* (2006.01)

(52) U.S. Cl.
USPC .......................................................... 706/52

(58) Field of Classification Search
USPC ..................................... 706/46, 52
See application file for complete search history.

(56) References Cited

U.S. PATENT DOCUMENTS

| | | | |
|---|---|---|---|
| 5,301,118 A * | 4/1994 | Heck et al. ................... 700/109 |
| 5,379,422 A * | 1/1995 | Antoshenkov ..................... 1/1 |
| 6,314,204 B1 | 11/2001 | Cham et al. | |
| 6,556,960 B1 | 4/2003 | Bishop et al. | |
| 7,072,811 B2 * | 7/2006 | Kadane et al. ..................... 703/2 |
| 7,409,325 B2 * | 8/2008 | Morara ............................. 703/2 |
| 2003/0061015 A1 * | 3/2003 | Ben-Gal et al. .................. 703/2 |
| 2003/0220906 A1 | 11/2003 | Chickering | |

OTHER PUBLICATIONS

David J. Lunn, Andrew Thomas, Nicky Best, and David Spiegelhalter. 2000. WinBUGS—A Bayesian modelling framework: Concepts, structure, and extensibility. Statistics and Computing 10, 4 (Oct. 2000), 325-337.*

Gough, K.J.; , "Parameter passing for the Java virtual machine," Computer Science Conference, 2000. ACSC 2000. 23rd Australasian , vol., No., pp. 81-87, 2000.*

Geman, Stuart; Geman, Donald; , "Stochastic Relaxation, Gibbs Distributions, and the Bayesian Restoration of Images," Pattern Analysis and Machine Intelligence, IEEE Transactions on , vol. PAMI-6, No. 6, pp. 721-741, Nov. 1984.*

* cited by examiner

*Primary Examiner* — Li-Wu Chang
*Assistant Examiner* — David H Kim
(74) *Attorney, Agent, or Firm* — Anderson Gorecki & Rouille LLP

(57) ABSTRACT

A method, apparatus and computer program product for performing probabilistic inference and providing related solution methods is presented. At least one state space (SS) is obtained for variables of interest relating to a problem of interest. None or more densities (D) defining pure functions over locations in the at least one SS are also obtained as is none or more kernels (K) defining a stochastic walk through the at least one SS. A virtual machine executes a stochastic walk through the state space to produce a solution for a problem of interest.

47 Claims, 6 Drawing Sheets

METHOD AND APPARATUS FOR PERFORMING PROBABILISTIC INFERENCE AND PROVIDING RELATED SOLUTION METHODS

CROSS REFERENCE TO RELATED APPLICATIONS

The present application claims the benefit of U.S. Provisional Patent Application No. 60/991,578, filed on Nov. 30, 2007, which is incorporated herein by reference in its entirety.

GOVERNMENT RIGHTS

This invention was made with government support under grant number IIS0534978 awarded by the National Science Foundation. The government has certain rights in this invention.

BACKGROUND

The challenge of specifying problems (i.e., problem capture) and methods for statistical inference and nonlinear/combinatorial optimization is well known. These challenges include, for example, the automatic derivation of effective inference and optimization algorithms (especially those based on Monte Carlo methods, local and systematic search as well as stochastic variants), as well as hybrids between automatically derived and user-specified algorithms; the automatic transformation and optimization of these algorithms; and the execution of these algorithms either in simulation or natively on commercial off-the-shelf (COTS) (i.e., von Neumann) computers, including massively parallel high-performance computers and Beowulf clusters.

SUMMARY

Conventional mechanisms for solving probabilistic inference problems and the like suffer from a variety of deficiencies. One such deficiency is that conventional techniques require the describing, modeling and solving of such problems using tools that are both labor intensive and compute intensive.

Embodiments of the invention significantly overcome such deficiencies and provide mechanisms and techniques that provide probabilistic inference solutions by means of: a language (hereinafter referred to as Blaise) for specifying probabilistic models, an inference engine for transforming the problem specification to automatically provide an appropriate inference algorithm or to restructure the existing problem specification to be more efficient, and a virtual machine for answering queries on the models in terms of optimization and integration such that solutions can be determined in an efficient manner.

In a particular embodiment of a method for providing a solution to a problem of interest (e.g. a probabilistic inference type problem or simulation), the method includes defining at least one state space (SS) for variables of interest relating to the problem of interest. The method also includes: defining none or more densities (D) relating to a fitness or confidence measure of a point in the at least one state space, and determining none or more kernels (K) for resolving the problem of interest using the at least one SS and the at least one D. The method further includes executing the at least one K on a virtual machine (VM) to determine a solution for the problem of interest and/or compiling a program for providing a solution to the problem of interest.

Other embodiments include a computer readable medium having computer readable code thereon for providing a solution to a problem of interest. The computer readable medium includes instructions for defining at least one state space (SS) for variables of interest relating to the problem of interest. The computer readable medium also includes instructions defining none or more densities (D) relating to a fitness or confidence measure of a point in the at least one state space, and instructions for determining none or more kernels (K) for resolving the problem of interest using the at least one SS and the at least one D. The computer readable medium further includes instructions for executing the at least one K on a virtual machine (VM) to determine a solution for the problem of interest and/or compiling a program for providing a solution to the problem of interest.

Still other embodiments include a computerized device, configured to process all the method operations disclosed herein as embodiments of the invention. In such embodiments, the computerized device includes a memory system, a processor, and a communications interface in an interconnection mechanism connecting these components. The memory system is encoded with a process that provides a solution to a problem of interest as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing a solution to a problem of interest as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
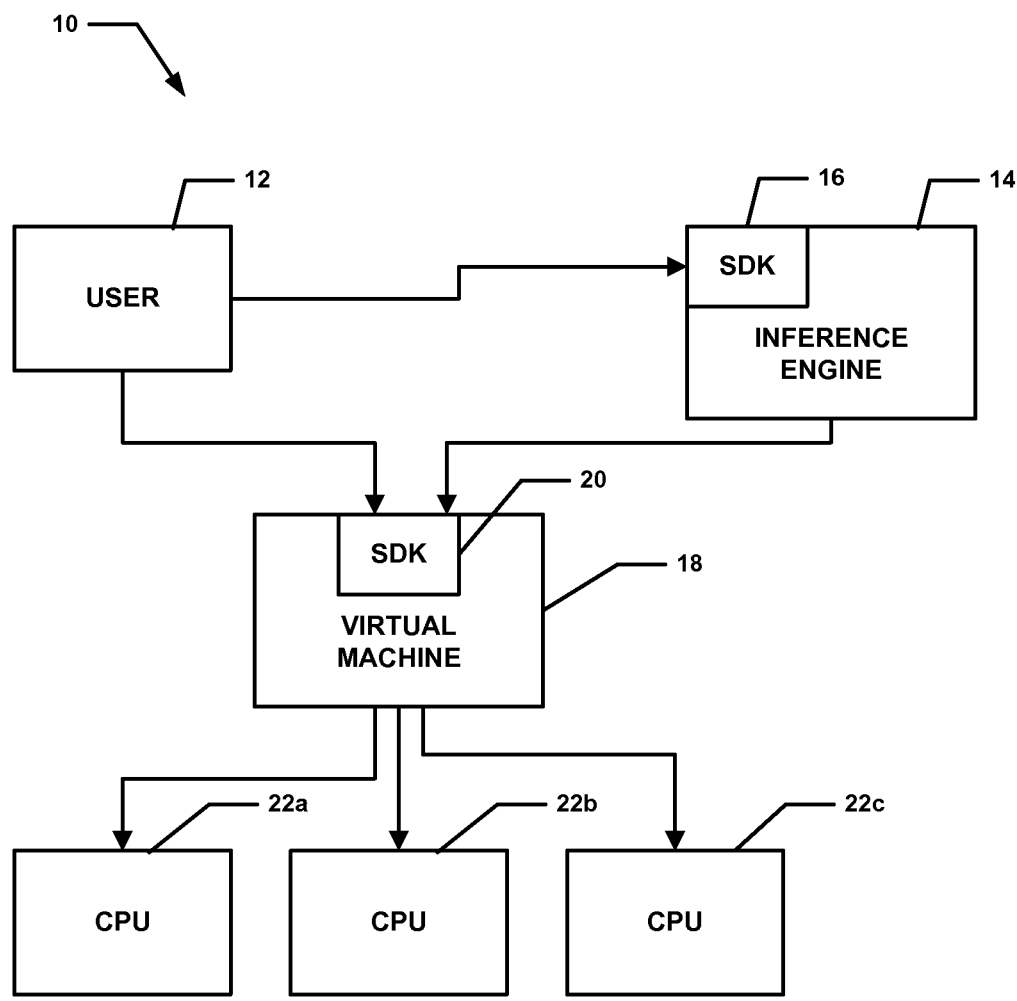
FIG. 1 depicts a block diagram of an environment for performing probabilistic inference and providing related solution methods in accordance with embodiments of the invention.
Figure 2A:
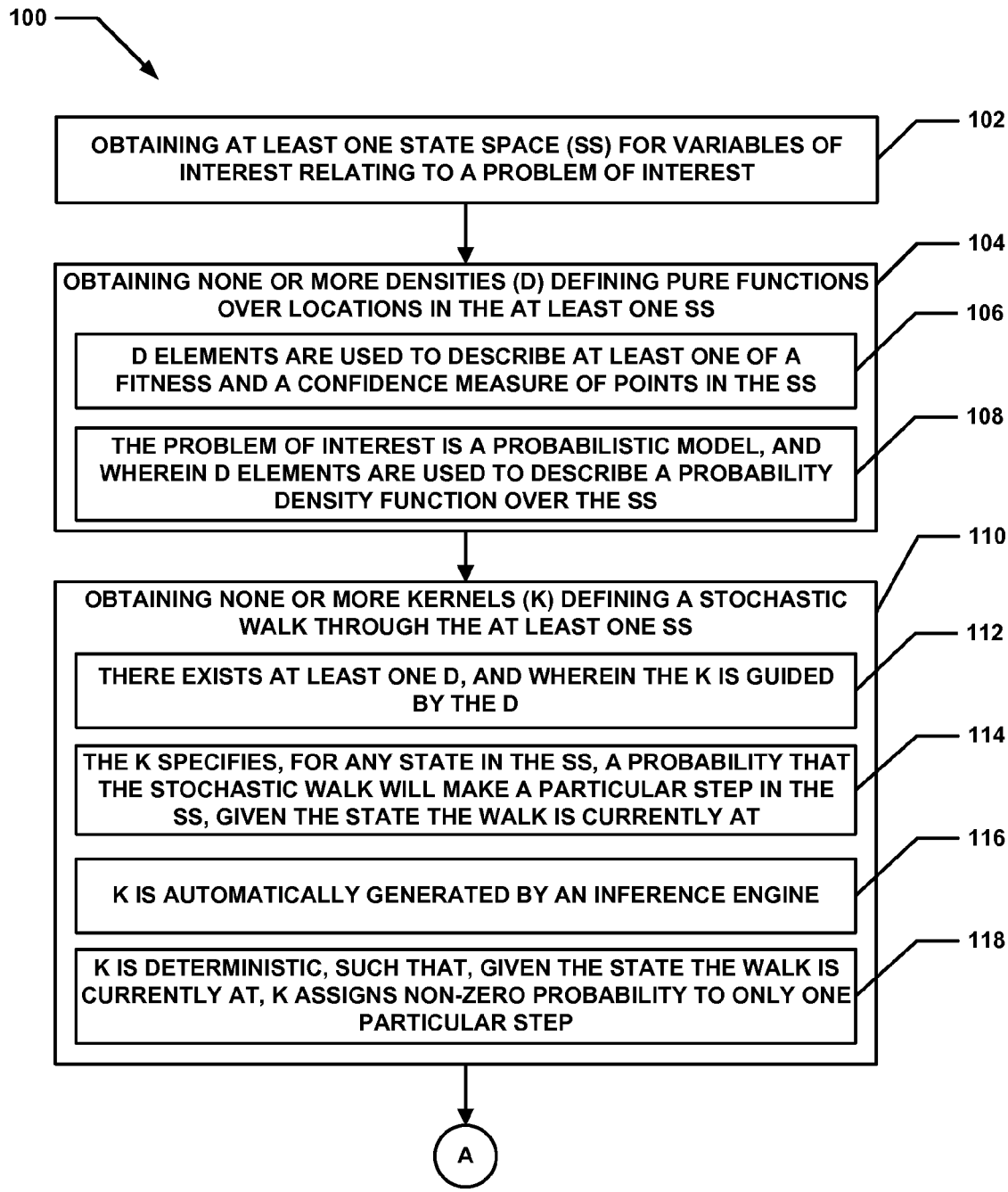
FIGS. 2A through 2D depict a flow diagram of a particular embodiment of a method of performing probabilistic inference and providing related solution methods in accordance with embodiments of the invention.
Figure 2B:
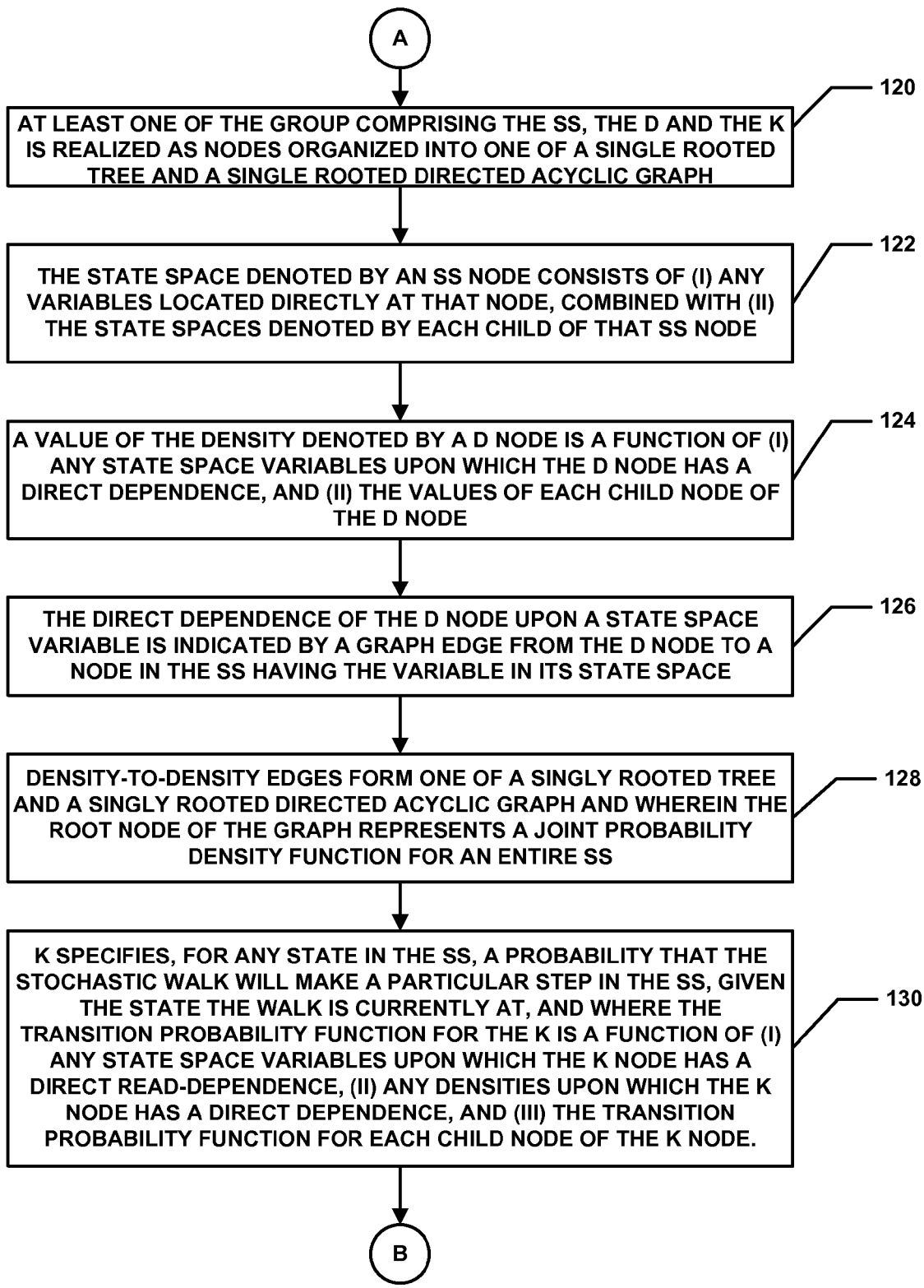
Figure 2C:
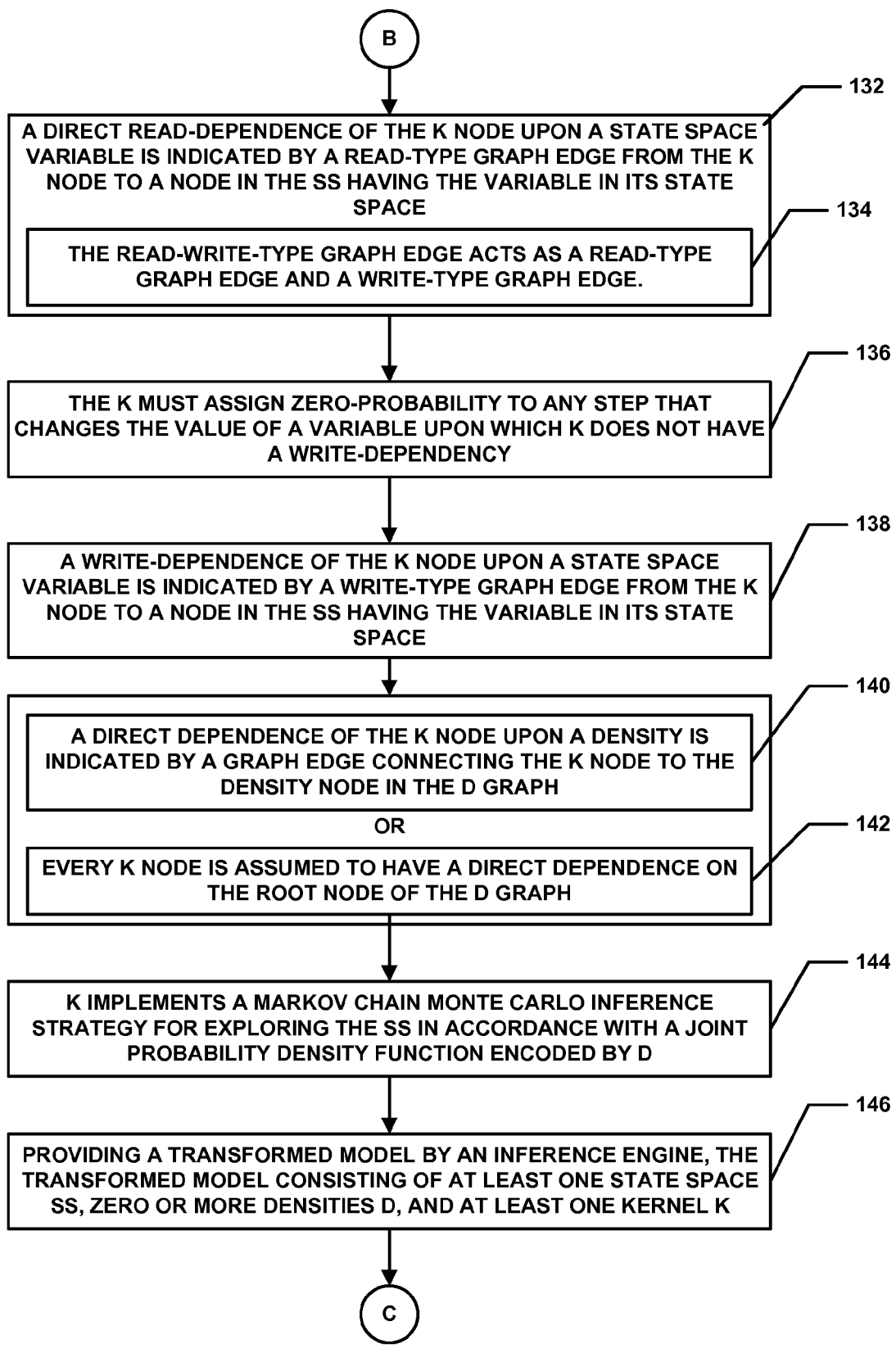
Figure 2D:
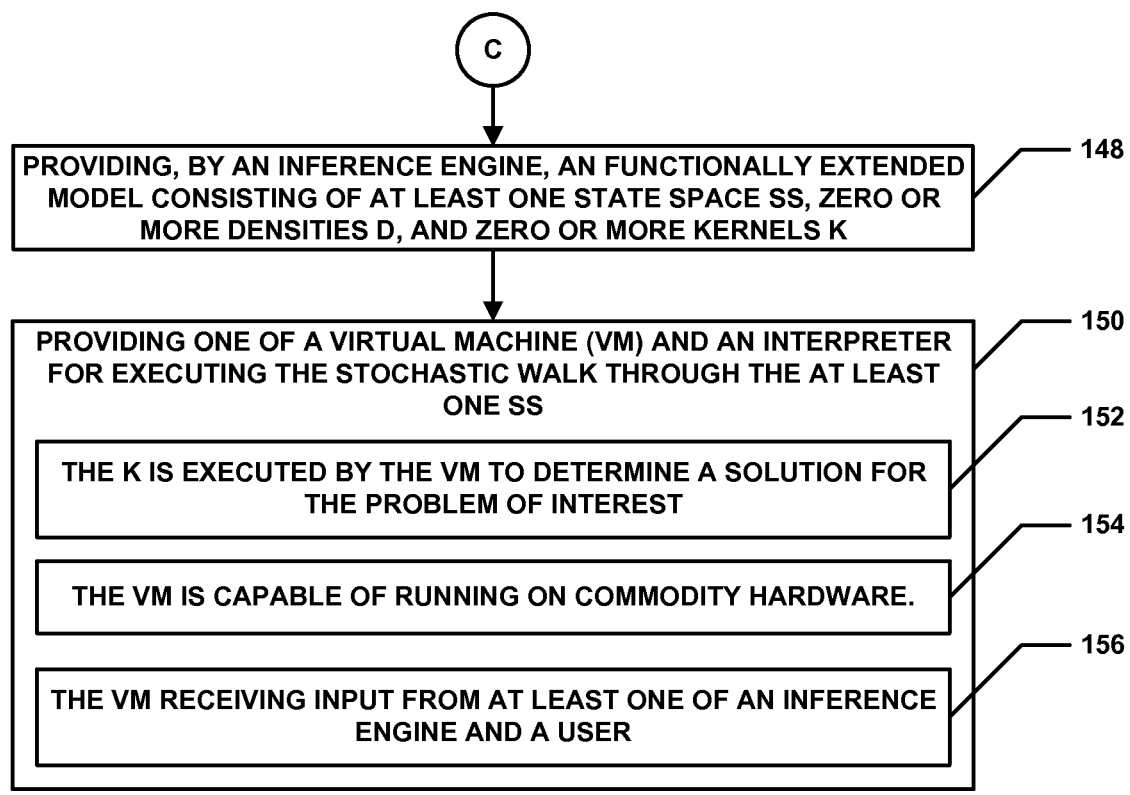

A software toolkit for high performance probabilistic inference is described. In a particular embodiment the software is realized as a Java-based toolkit, referred to hereafter as Blaise. Blaise includes three pieces; a flexible, powerful language for specifying probabilistic models, a set of transformations for restructuring a model in the Blaise language to improve the model's efficiency or to extend the model's capabilities, and a virtual machine well suited for answering queries on those models in terms of optimization and integration (which can be used effectively on optimization and integration problems arising outside of probabilistic modeling).

Blaise provides efficient implementations of the algorithmic and representational primitives for the computations arising in probabilistic inference, along with means of composition that support easy incremental development of high-performance algorithms.

Blaise is believed to be the only inference system that integrates advanced stochastic search primitives in a fully generic way. For example, every Markov Chain Monte Carlo (MCMC) search built from this toolkit can benefit from advanced techniques such as parallel tempering while maintaining efficiency and with almost no additional code.

Blaise provides primitives for the development of inference algorithms over structured domains, in contrast to existing toolkits which either emphasize inference for continuous parameters or top out at Bayes nets (but don't support natural development of other structured models, such as Hierarchical Dirichlet Process (HDPs) or the Latent Dirichlet Allocation (LDA) family, in terms of standard pieces). The primitives in Blaise emphasize the algorithmic commonalities between a variety of very different inference strategies. This architecture supports the creation of novel hybrid inference algorithms, such as the use of advanced MCMC techniques for optimizing the objective functions of variational inference.

In order to fully specify a probabilistic modeling application, three things must be described. One thing the modeler must describe is the state space (SS). The state space typically describes a vast number of possible variable instantiations, most of which the modeler is not very interested in. The second central abstraction, Density (D), allows the modeler to describe how interesting a particular state configuration is. For discrete probabilistic models, this is typically the joint probability mass function. If continuous variables are used, then Density would represent the joint probability density function (from which the abstraction derives is name). When describing how to score a State, the modeler expresses things such as: how the joint score decomposes into common pieces, such as standard probability distributions, and how the score accommodates state spaces with unknown numbers of objects. The Density abstraction is designed to represent the modeler's answers to these questions.

With State and Density in hand, the modeler can now express models, but cannot yet say how to extract information from these models. Blaise focuses on those inference techniques that can be described as history-free stochastic walks through a State space, guided by the Density. All such walks can be completely described by a transition kernel, defined as an expression of the probability that the stochastic walk will make a particular step in the state space, given the state the walk is currently at. To describe a transition kernel, a modeler will have to make choices such as which variables in the state space will change on this step, how exactly will these variables be updated (e.g., are there common update procedures that can be used), how will these update rules be coordinated so that the whole state space is explored efficiently (how are fragments of an inference algorithm composed) and how the inference method accommodates state spaces with unknown numbers of objects. Often the modeler will want to maintain a certain relationship between the Density and the exploration of the state space; for example, a modeler designing an Markov Chain Monte Carlo-based inference method will want to ensure that the transition kernel converges to the Density as an invariant distribution.

A common design tenet runs throughout the entire modeling language: support composability. That is, it should be easy for the modeler to reuse existing models in the creation of new models. For example, if the modeler has constructed a State-Density-Kernel (SDK) representation of a Chinese Restaurant Process (CRP), it should be easy for the modeler to reuse this representation to create a CRP-based mixture model. In most cases, in fact, the SDK for the original model should not need to be modified at all—even the same inference procedure should continue to work in the new model, despite the fact that there are now other States in the state space and other Densities affecting the joint probability density. Realizing this design philosophy means that if a modeler extends an existing model or composes several existing models, development resources can be reserved for the truly novel parts of the new model. Such an approach provides the leverage required to effectively engineer sophisticated models of increasing complexity, such as are becoming ever more important in artificial intelligence, cognitive science, and commercial applications.

The SDK foundation (consisting of a domain described using States, functions over the domain described using Densities, and a stochastic process for domain exploration described using Kernels, together with simple composition and locality rules for each of these representations) can also serve as a general framework for expressing and manipulating any stochastic (or deterministic) automaton.

A state space (SS) is represented using containment links, and is closed under composition (i.e. a language for building up state spaces out of pieces, with well-defined mathematical semantics). The state space represents variables of interest with respect to the problem being solved. The SS structure (i.e. topology of containment) is mutable, permitting compact representation of state spaces of changing topology over the course of inference or optimization (e.g. addition/removal of variables and objects). The SS contains constraints on its own structure via substrates that maintain validity and allow for derived quantities to be automatically computed and manipulated.

The state space describes the domain of the inference problem; that is, the variables and their valid settings. All probabilistic modeling languages have some representation of the state space: graphical modeling languages, such as Bayes nets and factor graphs, use nodes to represent variables, whereas programmatic modeling languages allow the user to declare variables. Blaise follows in the graphical modeling tradition by representing variables as graph nodes called States. State nodes are also typed, carrying information about what values the represented variable can take on. For example, a State node might be typed as a continuous variable, indicating that it will take real numbers as values.

Unlike classical graphical modeling languages, however, Blaise requires that its State nodes be organized into a rooted tree via containment (has-a) links in the graph. This organization is the foundation of State composition in Blaise as it allows the modeler to take several States and bundle them together as children of some parent State. Note that the space of States is closed under this composition structure: composing several States produces another State. The tree-structured organization of States is a critical enabler in modeling repeated structure in the state space. Information about repeated structure is commonly represented in a graphical modeling language using "plate notation"—drawing a box (a "plate") containing the variables that will be repeated, and writing a number in the corner of the box to indicate how many times that structure will be repeated. Blaise uses State composition to capture repeated structure. Blaise allows States to have arbitrarily-sized collections of children. Such Collection States are used to capture the idea of repetition. For example, a model that would be denoted in plate notation as a single variable x inside a plate would be captured in Blaise as a Collection State with a collection of x.

Composition allows the same containment mechanism to be used for repeated state structure rather than just single states. For example, a model that would be denoted in plate notation as two variables x and y inside a plate would be captured in Blaise as a Collection State with a collection of composite States, where each composite has an x and a y.

In variants of Blaise, the SS can also be realized as nodes organized into a single rooted direct acyclic graph (DAG). This generalization beyond trees may be used to indicate shared structures in the SS.

A density (D) is built up out of pieces glued together via functional composition; densities depend on state spaces and subdensities, and represent scores or unnormalized log probability densities, supporting efficient, compositional evaluation. Together, the state and density mechanism generalizes the algebraic representation of score functions/log joint densities/energy functions provided by factor graphs, Markov random fields, and Bayesian networks. The joint state and scoring structures include mechanisms for maintaining relations between states and scoring as they undergo changes to the structure; these tools can be viewed as a stochastic generalization of ideas from functional reactive programming.

Whereas States are used to model the domain of the state space for a probabilistic model, Densities are used to describe the joint probability density function over that state space. It is often advantageous to decompose the joint probability density function into a number of simpler Densities that only depend on a subset of the state space variables (i.e., a projection of the state space onto a lower-dimensional subspace). For example, Bayes nets decompose the joint Density into a product of conditional probabilities and factor graphs decompose the joint Density into a product of factors.

Decomposing the density is beneficial for several reasons. Just as the Blaise State representation can be viewed as an extension of the Bayes net/factor graph representation of variables, the Blaise Density representation is an extension of the factor nodes in a factor graph. Like factor nodes, Blaise Densities are graph nodes that have edges connecting them to each of the States on which the value of the Density depends.

Unlike factor graph nodes, however, Blaise Densities are structured into a rooted tree. In addition to Density-State edges, a Density might also have edges connecting it to other Densities, the value of which it might depend upon. These Density-Density edges form a rooted tree where the root node represents the joint probability density function for the entire state space. Leaf nodes in the Density tree typically represent common (primitive) probability densities. Internal nodes in the Density tree represent functional composition of Densities. Whereas the only functional composition rule permitted (implicitly) in factor graphs is multiplication (i.e. the total joint density is the product of the factors), the Blaise modeling language allows great freedom in the functional form of a Density.

In variants of Blaise, the D can be realized as nodes organized into a rooted DAG, representing shared use of Density values.

Stochastic transitions (kernels) on SS are also represented via another parallel structure representing algorithmic decomposition. The kernel (K) structure (and the domain of the densities touched by a kernel structure) defines abstract machines, which if executed, perform inference or optimization. Kernels can be composed in many ways, including stochastic or deterministic cycles and stochastic mixtures, permitting the construction of large algorithms from small algorithmic pieces. Stochastic transitions include virtual hybrid transitions, cycles or mixtures that dispatch more primitive transitions onto collections in the state space. The caching of partial scores is provided for improved operation, while also allowing for all evaluation in terms of root score. Thus, the SS and D define the problem of interest and K defines a solution. The K can be realized as nodes organized into a single rooted tree and/or a single rooted DAG.

A State-Density graph describes a complete probabilistic model in terms of a joint density over a state space. While existing probabilistic modeling languages typically stop here, Blaise goes one step farther by also graphically representing the inference procedure that will be executed on the model. Blaise focuses on those inference techniques that can be described as history-free stochastic walks through a State space, guided by a Density. Restricting inference to methods that can be implemented as history-free stochastic walks is actually not as restrictive as it may first appear, given that deterministic walks are a subset of stochastic walks, and that the state space may be augmented with any information that would normally be considered the history of the kernel.

The central abstraction for inference procedures in Blaise is the Transition Kernel, typically abbreviated to just Kernel.

It should be understood that, despite their name, Transition Kernels are unrelated to the kernels used in "kernel methods'" such as support vector machines, or to kernels of homomorphisms in algebra, etc. Mathematically, a transition kernel is an expression of the probability that the stochastic walk will make a particular step in the state space, given the state the walk is currently at. That is, if the walk is currently at State $S_t$, a transition kernel will specify, for any State $S^*$ in the state space, the probability that the next state $S_{t+1} = S^*$. This probability could be written $p(S_{t+1} = S^* | S_t)$ however, the alternate notation $K(S_t \rightarrow S^*)$ is used to emphasize the directionality of the transition being evaluated.

In Blaise graphical models, a Kernel operates on some subgraph of the State hierarchy. Most Kernels operate on only a single State and may only inspect or modify that State and its descendents. The State that the Kernel operates on is indicated graphically using a directed edge from the Kernel to the State. For example, a Kernel that will resample the value of a continuous State variable must have a directed edge to that State or one of its ancestors. More complex Kernels may use multiple Kernel→State edges, indicating that the Kernel operates on a sub-forest of the State graph (rather than a simple sub-tree in the single-edge case). For example, if a mixture model's components were represented as Collection States, then a datapoint reassignment Kernel would change the assignment of a datapoint by removing the datapoint from one component's Collection State and adding it to another component's Collection State. Such a Kernel could be implemented with a single edge to a common ancestor of the two components. Alternately, the Kernel could be implemented with two edges: one to the source component and one to the target component. The latter implementation allows the Kernel to be reused more flexibly by separating the datapoint reassignment logic from the component selection logic.

Kernels also have limited access to the Density graph: Kernels may evaluate the root node of the Density tree, but may not inspect the Density tree in any other way. Specifically, Kernels may not inspect the structure of the Density tree, nor may they modify the Density tree, nor may they evaluate any node but the root node of the Density tree. These restrictions are motivated by two points: first, all density calculations required for standard inference can be couched as evaluations of the root Density node. Second, it is a central design goal for Blaise to support composition of models, including inference algorithms on those models, and further including that it should be possible to mix-and-match fragments of models with minimal effort. If the Kernel were permitted to inspect the Density tree, it would be much more difficult to perform these types of composition.

Variants of Blaise explicitly model the dependence of a Kernel on the value of a specific Density. In such variants, rather than assuming that all Kernels depend on the root Density, it is assumed that each Kernel has an edge connecting it to each Density upon which it depends. Under this scheme, model composition may be more challenging, however an inference engine may be able to perform additional optimizations by taking advantage of the explicit dependency information.

Every Blaise Kernel provides a SAMPLE-NEXT-STATE operation; this operation considers the current state $S_t$ and samples a next state $S^*$ for the stochastic walk from the transition distribution encoded in the kernel, i.e. $S^* \sim K(S_t \rightarrow S^*)$. Standard Markov Chain Monte Carlo inference in Blaise, then, is a matter of initializing the State structure so that it is in the domain and it matches the observed evidence, repeatedly calling SAMPLE-NEXT-STATE on an appropriate Kernel (i.e. a Kernel with the correct invariant distribution), and recording the states visited by the stochastic walk as samples from the target distribution.

The observed variables should be held constant either by attaching Kernels only to the unobserved variables or by attaching Dirac delta Densities to the observed variables (such that any value but the observed value causes the Density to evaluate to 0).

Blaise Kernels may also support two optional operations: SAMPLE-NEXT-MOVE and ENUMERATE-POSSIBLE-MOVES. SAMPLE-NEXT-MOVE is much like SAMPLE-NEXT-STATE, except that instead of producing just a sample $S^*$, SAMPLE-NEXT-MOVE produces a Move object:

$$S_t \xrightarrow{K} S_*.$$

A Move object carries several pieces of information. The next state is still available:

$$\text{MOVE-TARGET}\left(S_t \xrightarrow{K} S_*\right) \triangleq S_*.$$

Move objects also carry additional information, such as the probability that the Kernel's SAMPLE-NEXT-MOVE will produce this move:

$$\text{MOVE-FORWARD-TRANSITION-DENSITY}\left(S_t \xrightarrow{K} S_*\right) \triangleq K(S_t \rightarrow S_*)$$

and the probability that the Kernel's SAMPLE-NEXT-MOVE would produce the inverse move from the target state:

$$\text{MOVE-REVERSE-TRANSITION-DENSITY}\left(S_t \xrightarrow{K} S_*\right) \triangleq K(S_* \rightarrow S_t).$$

Finally, in order to support transdimensional MCMC, Moves also carry information about the Jacobian of the Move under the Kernel, accessible via MOVE-JACOBIAN.

SAMPLE-NEXT-MOVE enables the fully generic implementation of algorithms such as Metropolis-Hastings and particle filtering. Note that any Kernel implementing SAMPLE-NEXT-MOVE can implement SAMPLE-NEXT-STATE simply as

SAMPLE-NEXT-STATE( )=MOVE-TARGET (SAMPLE-NEXT-MOVE).

The other optional operation of a Kernel is ENUMERATE-POSSIBLE-MOVES, which produces the set of all possible Move objects that that could be returned by a call to SAMPLE-NEXT-MOVE. Note that implementing ENUMERATE-POSSIBLE-MOVES may be impossible; for example, if the Kernel operates on continuous variables, it probably can produce an infinite number of distinct moves, and thus can't implement ENUMERATE-POSSIBLE-MOVES. ENUMERATE-POSSIBLE-MOVES enables the fully generic implementation of algorithms such as Gibbs sampling for enumerable variables. Any Kernel that implements ENUMERATE-POSSIBLE-MOVES can implement SAMPLE-NEXT-MOVE simply by sampling from the set of Moves produced by ENUMERATE-POSSIBLE-MOVES, with each Move $$S_t \xrightarrow{K} S_*$$

sampled with probability proportional to $$\text{Root-Density}\left(\text{MOVE-TARGET}\left(S_t \xrightarrow{K} S_*\right)\right).$$

Like States and Densities, Kernels are also composed into trees. In the case of Kernels, the tree structure represents algorithmic composition: a Kernel may call operations on any of its child Kernels any number of times as part of its operation. Composition Kernels may also be viewed as analogous to the control-flow operations in other programming languages (e.g. for, case, if-then-else, etc.), including stochastic generalizations of these constructs.

Hybrid Kernels are the most common composite Kernels because they are stationary distribution-preserving; that is, if all of a hybrid Kernel's child Kernels share a stationary distribution on the State space, then the hybrid Kernel is guaranteed to share that stationary distribution as well. The two standard hybrid Kernels are the cycle and mixture hybrids. A concrete cycle Kernel can have an arbitrary number of child Kernels and implements SAMPLE-NEXT-STATE by calling SAMPLE-NEXT-STATE on each of its child Kernels one after another. If the child Kernels are unrelated, the resulting sequential control flow will be similar to a series of statements in an imperative language like Java or C, or like the body of a "begin" statement in Scheme. If, instead, each child Kernel performs the same operation but targets a different State, the resulting control flow is akin to a "for" statement.

A concrete mixture kernel has an arbitrary number of child Kernels and associates a weight with each child Kernel; when the hybrid Kernel's SAMPLE-NEXT-STATE operation is called, the Kernel first selects one of its child Kernels, sampled proportional to their weights, then delegates to the selected child's SAMPLE-NEXT-STATE method. The resulting control flow is analogous to a "case" statement, where the expression being switched upon is a random number drawn according to the child Kernels' weights.

Blaise also introduces a novel class of hybrid Kernels: conditional hybrid Kernels. A (binary) conditional hybrid Kernel has two child Kernels; a TRUE-Kernel and a FALSE-Kernel. It also has a deterministic binary predicate that is defined over the Kernel's operating State Space. A conditional hybrid Kernel interprets calls to SAMPLE-NEXT-STATE by evaluating the predicate, then delegating to the child Kernel associated with the predicate's result (i.e. if the predicate evaluates to true, then the conditional hybrid Kernel delegates to its TRUE-Kernel's SAMPLE-NEXT-STATE operation). Conditional hybrid Kernels are not restricted to binary predicates; the predicate may be replaced with any deterministic function of the State, so long as the conditional hybrid Kernel can map any value of the function to exactly one child Kernel. If all the children of a conditional hybrid Kernel share a stationary distribution, and if no child can change the value of the conditional hybrid Kernel's predicate/expression, then the resulting conditional hybrid Kernel is guaranteed to have the same stationary distribution as its children. The control flow resulting from a conditional hybrid Kernel is much like an "if" statement or a "case" statement.

As State spaces vary in dimension, it is also important to ensure that Kernels are dispatched appropriately to explore the entire State space. For example, in the mixture model example, it is important to make sure that Kernels for component parameter inference are applied to each of the components, no matter how many components exist. If the number of components is known a priori, the designer can simply use a concrete hybrid kernel (either a mixture or a cycle).

Blaise introduces a novel kind of Kernel, called a virtual hybrid Kernel, to manage Kernel dispatch over Collection States. A virtual hybrid Kernel can be thought of as a concrete hybrid Kernel that has, as children, a copy of a subkernel for each element of the Collection State. For example, a virtual cycle Kernel for the components of a mixture model would act as if it had one copy of the component-parameter-adjustment-kernel for each component in the mixture. When a component is added, the virtual cycle acts as if it has had added a new component-parameter-adjustment-kernel with an edge to the new component.

Virtual hybrid Kernels are called "virtual" because they only actually need one copy of the child Kernel; rather than making many copies of the child Kernel, the virtual hybrid just calls the same child Kernel multiple times, directing it at a different state each time. Virtual hybrid Kernels are possible because Kernels are history-free, that is, stateless.

Like concrete hybrid Kernels, virtual hybrid Kernels have the property that the hybrid Kernel shares the same stationary distribution as its child Kernel, so long as it can be guaranteed that the child Kernel is unable to change the number of children in the Collection State that the virtual hybrid Kernel is operating on. This restriction can be understood by considering the reduction of a virtual hybrid Kernel to a conditional hybrid of concrete hybrids. The conditional hybrid would use the size of the Collection State as its partitioning function—that is, it would partition the State space into subspaces in which the Collection State has a fixed number of children (for example, one subspace might contain only those states where the Collection State has two children). The hypothetical conditional hybrid would have a concrete hybrid kernel for each subspace, where that concrete hybrid kernel would have a copy of the virtualized subkernel for each child of the Collection State. Such a Kernel structure will have the correct stationary distribution, so long as the virtualized hybrid Kernel cannot change the value of the partition function; that is, cannot change the size of the Collection State.

Kernels are normally invoked by calling SAMPLE-NEXT-STATE on the root of the Kernel hierarchy, with each such call advancing the Markov Chain to the next state. Blaise supports decoupled State initialization by introducing a second way for Kernels to be invoked: when new elements of State are added to the State structure and need to have an initial value sampled for them, an Initialization Kernel is triggered. Initialization Kernels are bound to specific locations in the State space; for example, one Initialization Kernel might be triggered only by new States being created as a specific Collection State's children, while a different Initialization Kernel might be responsible for initializing State elsewhere in the State hierarchy.

Initialization Kernels are automatically invoked on pieces of State that needs to be initialized. For example, in a mixture model, when a new component is created as part of some Kernel's SAMPLE-NEXT-STATE operation, any component parameter $\theta$ in the State is given a dummy value, before the component is added to the components Collection State. This triggers an invocation of the Initialization Kernel's SAMPLE-NEXT-STATE on the new mixture component, allowing $\theta$ to be initialized. Modifications to the State space as a result of a constraint are considered to be part of the operation that triggered the constraint; this includes any State initialization done by Initialization Kernels. In the mixture model example, this implies that a component birth/death Kernel would produce Moves for which operations such as MOVE-FORWARD-TRANSITION-DENSITY include the probability of any triggered Initialization Kernels sampling the values they did. In other words, there are two ways for one Kernel A to invoke another Kernel B: either A could have B as a child and invoke it directly, or A could cause some change to the State space which triggers an invocation of B as an initialization Kernel; in either case, though, any sampling performed by B on behalf of A will be accounted for by MOVE-FORWARD-TRANSITION-DENSITY, etc. Similar patterns allow the automatic invocation of Initialization Kernels as part of SAMPLE-NEXT-MOVE and ENUMERATE-POSSIBLE-MOVES operations.

Initialization Kernels are also invoked when a previously initialized State is about to be destroyed. The Initialization Kernel is signaled that this is a destroy operation rather than a construction operation, enabling the Kernel to make the appropriate contributions to the Move (e.g., incorporating into to the Move's MOVE-REVERSE-TRANSITION-DENSITY value the probability of sampling this exact configuration on a subsequent Initialization).

It is worth noting that hybrid Kernels may also be used to construct Initialization Kernels via composition. For example, one might choose to use a concrete mixture Kernel to randomly choose between two different initialization strategies.

In some embodiments a virtual machine (VM) is provided for executing the programs specified by the structured representation to perform inference and optimization (both directly and by reduction to machine code). The VM may also include a transactional undo/redo mechanism, allowing for efficient Markov Chain construction including rollback of unapplied transitions and maintenance of detailed balance conditions.

The Blaise Virtual Machine comprises a software framework that executes the stochastic processes described by SDK graphs on common off-the-shelf computers. In a particular embodiment, the Blaise VM is implemented in Java. Each State, Density, and Kernel in a Blaise model is represented as a Java object. Blaise provides abstract base classes for States, Densities, and Kernels; each of these classes extends a common graph node base class, Node, which provides support for assembling the SDK graphical model from the individual State, Density, and Kernel objects. Node provides support for directed graph semantics, and allows edges to be efficiently traversed in either direction. Node also allows specific edges to be efficiently located based on a number of criteria, including the role the edge plays (e.g. State→State versus State→Density), incidence (i.e. incoming versus outgoing), and user-specified tags (for example, a State containing two children, one representing a random variable α and one representing a random variable β, might tag its outgoing State→State edges "alpha'" and "beta", respectively.) The Node abstraction also provides facility for passing messages across incoming edges (e.g. from a Node to its "parents'"). Messages can be selectively propagated across only those incoming edges that have certain roles in the graph (e.g. a message might propagate across only State→Density or Density→Density edges). The specific messages used by the Blaise VM will be described below.

The VM supplies abstract base classes for each of the central representations (State, Density, Kernel) as well as standard modeling components for each of those representations. Specifically, the VM provides a State abstract base class, along with States for primitive variables (e.g. Integer State, Real State, Boolean State, etc.) and Collection States. The VM also makes it easy to create composite States. The VM also provides a Density abstract base class, along with Densities for common probability distributions (e.g. Gaussian, Poisson, Chinese Restaurant Process, etc.), Densities for conjugate models (e.g. a Beta-Binomial Density) and Multiplicative and Associated Collection Densities. The VM also makes it easy to create composite Densities. Further the VM provides a Kernel abstract base class, along with Concrete Hybrid Kernels (i.e. Concrete Mixture Kernels, Concrete Cycle Kernels, Concrete Conditional Kernels), Virtual Hybrid Kernels (i.e. Virtual Mixture Kernels, Virtual Cycle Kernels), Kernels for specifying the piece of a state space that another Kernel should operate on (called "Let Kernels"), Kernels for Metropolis-Hastings and enumerative Gibbs Sampling and Kernels for performing simple inference on primitive variables (for example, the Gaussian Perturbation Kernel used for Metropolis-Hastings on real-valued States).

Moving around the state space is the most central operation in Blaise, and therefore must be as efficient as possible. For this reason, States are mutated in place rather than copied. For example, a Kernel's SAMPLE-NEXT-STATE is an operation that takes a state $S_t$ and samples a next state $S^*$ by mutating the $S_t$ to become $S^*$. In-place mutation is more efficient both in terms of space (no need for multiple copies of the State hierarchy to be held in memory) and in terms of time (no need to spend time copying the State hierarchy.)

As State and Density structures grow more complex, it will often be the case that changes to a small piece of the State space will only cause the value of a small number of the Densities to change. For example, changing the parameters in one component of a mixture model will not affect the Densities attached to any of the other components. The Blaise VM therefore memoizes Density evaluations; whenever a Density is evaluated, the value is cached in the Density. Whenever a State changes value or structure, the Blaise VM ensures that all dependent Densities have their memos flushed. This is achieved by having the changing State emit a message that propagates up State→Density and State→State edges; whenever a Density receives such a message, the Density flushes its cache. The Density also emits a message that propagates up Density→Density edges so that all parent Densities flush their cache as well. The next time density($D_{root}$) is evaluated, all these Densities will have their value recomputed using the new State values.

This memoization is critical to Blaise's efficiency and eliminates a lot of complications when designing algorithms. For example, consider computing the Metropolis-Hastings acceptance ratio. One of the terms in this ratio, $$\frac{p(s_*)}{p(s_t)}$$

involves comparing the joint density of two states: the proposed state and the current state. When crafting an efficient algorithm by hand, a practitioner will often symbolically manipulate the joint densities to cancel terms that are known not to change, so that time is not spent computing these terms. These considerations must be made separately in each M-H kernel, because each kernel will make changes that affect different terms in the joint density. Any change to the structure of the joint density also requires reconsidering which terms will change. Considering both the large number of times when these considerations must be made, and the fact that this tends to be an error-prone process, the result is in an extremely brittle system.

The Blaise VM relies on the automated memoization of Densities instead of manual cancellation of terms. In a Blaise M-H Kernel, the Densities whose caches are invalidated by a move $$S_T \xrightarrow{K} S_*$$

are exactly the Densities whose values change because of the move; that is, the same set of Densities that would remain after the manual cancellation of terms described above. The Blaise VM therefore achieves similar performance to the symbolic approach, while remaining automated and robust to the modification of M-H proposal Kernels or changes to the joint density landscape.

Memoization conserves a lot of computation, but there is still significant opportunity for wasted computation whenever changes to the State space are "undone". For example, consider a Metropolis-Hastings Kernel that proposes the move $$S_T \xrightarrow{K} S_*.$$

To evaluate the acceptance ratio, the Kernel first evaluates density($D_{root}$) while the State hierarchy is configured to $S_T$, then updates the State hierarchy to reflect S* and evaluates density($D_{root}$) again. Suppose the Kernel rejects the proposal, and reverts the State space back to $S_T$. If the next Kernel also needs to evaluate density($D_{root}$), should it have to re-evaluate all the Densities that are dependent on the States that the Metropolis-Hastings Kernel touched, even though the State hierarchy is back in $S_T$, and density($D_{root}$) was previously computed for this configuration?

The Blaise VM eliminates this wasted computation by using a transaction system to manage States and Densities. The VM's transaction management system allows a Kernel to begin a State-Density transaction, make changes to the State space that result in changes to the Density space, and then roll back the transaction to efficiently return the State and Density hierarchies to their original configuration. A rolled-back transaction can also be re-applied, which will efficiently put the State and Density hierarchies in the configuration they were in before the transaction was rolled-back. Transactions can be committed (making the applied configuration permanent) or aborted (making the rolled-back configuration permanent).

The Blaise VM can nest transactions in other transactions. For example, suppose one Kernel begins a transaction, then invokes a second Kernel to do some work on the State space. The second Kernel is permitted to begin its own transaction, and this transaction would be nested inside the first Kernel's transaction. If the second Kernel commits its transaction, any mutations performed as part of that transaction will be absorbed by the outer Kernel's transaction.

A stack of nested transactions is sufficient to support a Metropolis-Hastings Kernel, but there is also a need to support an enumerative Gibbs Kernel. Such a Kernel evaluates density($D_{root}$) on many candidate states before sampling just one to be the actual next state. The transaction manager also supports this interaction pattern by extending the stack of transactions to a tree of transactions; that is, it is possible to begin a transaction, roll it back, begin a new transaction (parallel to the first one), roll that back too, then re-apply and commit either of the transactions. With such a system, even an enumerative Gibbs Kernel does only as much computation as is strictly necessary.

Because Multiplicative Densities are such a common Density composition tool in Blaise, special care was taken in the Virtual Machine to ensure that these Densities are efficient. Consider a Multiplicative Collection Density with some number of child Densities. Suppose a Kernel modifies a State that affects just one of those child Densities. The child density attached to this State will have its memoized value cleared; all the other child Densities will retain any memoized values they had. The Multiplicative Collection Density's memoized value will also have its memoized value cleared, reflecting the fact that it needs to be recomputed because one of its children has changed value. A naive implementation of the Multiplicative Collection Density would just recompute the product of its children's values from scratch; only the changed child would have to do any work to determine its value, but just asking each child for its value means that the Collection Density's operation would take time linear in the number of children. If the number of children is large, this can be a significant waste of effort, and such situations are not uncommon. For example, Multiplicative Densities could be used to support mixture models that may have large numbers of components, such as the Infinite Relational Model or to support large graphical models. Introducing an O(#children) slowdown is therefore highly undesirable.

Instead, the Multiplicative Collection Densities in the Blaise VM are implemented using an incremental update mechanism that reduces the O(#children) operation to an $O(k)$ operation, where k≤#children is the number of recently invalidated child densities. The Multiplicative Density partitions its child densities into two disjoint sets: $C_{used}$ and $C_{pending}$. It also maintains an internal cache of the value density$_{used}$=Π $C_i \in C_{used}$. When a child density $C_i \in C_{used}$ is invalidated, the cache is updated by the rule $$density_{used} \leftarrow \frac{density_{used}}{density(C_i)},$$

where density($C_i$) represents the density before taking into consideration the invalidation-causing change; $C_i$ is also moved from $C_{used}$ to $C_{pending}$. Then density(d) can be evaluated by performing the update density$_{used}$←density$_{used}$ Π$C_i \in C_{pending}$ density ($C_i$), moving all densities from $C_{pending}$ to $C_{used}$, and returning density$_{used}$. The size of the set $C_{pending}$ is k because it contains exactly those child Densities that have been modified since the last evaluation of the Multiplicative Density; thus evaluating Density in $C_{pending}$ is an O(k) operation.

Other Densities can benefit from similar incremental-update mechanisms. For example, conjugate model Densities such as the Beta-Binomial Density use incremental updates to maintain the sufficient statistics for the conjugate model and to maintain a running product of predictive densities so that the marginal likelihood can be evaluated efficiently.

Modifications to the State hierarchy, especially changes to the structure of the hierarchy, can require many sympathetic changes elsewhere in the SDK model: Densities may evaluate to a different value, Associated Collection Densities may need to construct a new child Density or remove an existing child Density, and virtual hybrid Kernels may now have a different number of States to cycle or mix over.

Similarly, an Associated Collection Density responds to messages from its Associated Collection State; messages indicating that a child State was added cause the Associated Collection Density to construct a new Density and attach it to the new child State, whereas messages indicating a child State was removed cause the corresponding child Density to be removed from the Associated Collection Density.

Kernels maintain no state whatsoever (unlike States, which are clearly stateful, as well as Densities, which have internal state to enable caching). Furthermore, in the Blaise VM representation of SDK models, Kernel→State edges aren't even explicitly represented; instead, the State that a Kernel should operate on is passed to the Kernel as a parameter.

Therefore, Virtual Hybrid Kernels do not require a separate copy of the virtualized child Kernel for each child of the Collection State that the hybrid kernel will mix or cycle over. Instead, the Hybrid Kernel simply determines which children are currently contained in the Collection State that it is passed at invocation time. For example, a Virtual Cycle Kernel would be passed a Collection State S* and would find the Collection State's children $S_1 \ldots S_N$. The Virtual Cycle Kernel would then invoke its virtualized child Kernel N times, each time passing as an argument a different child State (i.e., a different element in the set $\{S_1 \ldots S_N\}$). Because Kernels are invoked using an argument-passing paradigm rather than actually having edges connecting to the State hierarchy, the Kernel structure does not need to change over the course of inference.

In Blaise, there are two ways for Kernels to be invoked. First, the root of the Kernel hierarchy can be applied to the root of the State hierarchy, which results in the State hierarchy advancing one step in the Markov Chain. Alternately, Initialization Kernels may be invoked in response to pieces of State being created or destroyed. Whenever a new piece of State that may need to be initialized (such as a new component in a mixture model) is created and attached to the State hierarchy, the Virtual Machine determines where in the State hierarchy the new State was attached and looks up whether any Initialization Kernels were configured to handle initializations matching this location. If so, the Initialization Kernel is invoked on the new State. Likewise, when that State is later removed from the State hierarchy, the Virtual Machine will look up the same Initialization Kernel and once again invoke it on the new State, this time passing the Initialization Kernel a flag indicating that it should De-initialize this State.

Blaise further includes means by which to dynamically create and destroy regions of SS, each of which can be stochastically initialized. Blaise also provides a generalized relative addressing scheme for references into the structured representation, which is robust to changes in underlying representation, with the potential to support distributed references across a network as well as permitting the transformation of the structured representation, allowing for optimization of inference and ease of composition.

Another feature provided by Blaise is the interpretation of higher-order inference techniques in terms of graph transformation and composition, including automatic generation of parallel tempered inference and particle filtered inference and all combinations thereof.

Still other features of Blaise include the ability to automatically analyze structured representation and distribute inference computations across multiple machines (both virtual and real), to abstractly describe the structured representations and to determine whether any particular structure complies with a given description. Blaise also provides query-structured representations for computed values and the ability to translate from a high-level declarative (what is the problem to be solved) representation through the structured representation into procedural, efficient machine code (how to solve the problem) for execution on von Neumann computers.

The presently described process further provides a method for executing the virtual machine on distributed, unreliable computational substrates with changing membership (e.g. computers or cores dynamically being added or removed), providing a coherent computational engine out of heterogeneous parts for solving these problems; example substrates include distributed supercomputers (built out of the idle cycles of a large group of workstations physically distributed), Beowulf clusters, machines like the Google cluster, custom supercomputers with high performance interconnect, and other networked workstations of multicore or massively multicore machines.

As probabilistic machine learning technology is becoming more widespread, there has been increasing demand for simple tools for building probabilistic models that don't require expertise in numerical analysis, Monte Carlo methods, and the like.

Referring now to FIG. 1, an example of an environment implementing the presently disclosed method and apparatus for performing probabilistic inference and providing related solution methods is shown. A user 12 provides a state space (SS) for variables of interest relating to a problem of interest. The user also provides none or more densities (D) defining pure functions over locations in the SS, and none or more kernels (K) defining a stochastic walk through the SS. Together the SS, the D and the K are referred to as an SDK.

An inference engine 14 receives the SDK from user 12 via an SDK interface 16. The inference engine is able to generate an optimized SDK model for Virtual Machine (VM) 18.

VM receives an SDK model via it's SDK interface 20. The VM 18 receives the SDK model either directly from the user 12 or can receive an optimized model from inference engine 14. The VM 18 executes the kernel to determine a solution for the problem of interest.

The VM can run across one or more piece of commodity computer hardware, shows as CPU blocks 22a, 22b and 22c. The VM executes a stochastic walk described by the SDK to obtain the solution.

Flow diagrams of particular embodiments of the presently disclosed methods are depicted in FIGS. 2A through 2D and FIG. 3. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A through 2D, a particular embodiment of a method 100 for performing probabilistic inference and providing related solution methods in accordance with embodiments of the invention is shown.

Method 100 starts with processing block 102 which discloses obtaining at least one state space (SS) for variables of interest relating to a problem of interest. This includes finding patterns and making probabilistically calibrated predictions based on those patterns. For example, determining whether there exists sub-types of cells that coherently co-express certain genes or, given a set of seismic measurements, making determinations about the geo-physical volume the measurements relate to (e.g. the presence of salt deposits within the geo-physical volume).

Processing block 104 states obtaining none or more densities (D) defining pure functions over locations in the at least one SS. Processing block 106 recites D elements are used to describe at least one of a fitness and a confidence measure of points in the SS. Processing block 108 discloses the problem of interest is a probabilistic model, and wherein D elements are used to describe a probability density function over the SS.

Processing block 110 states obtaining none or more kernels (K) defining a stochastic walk through the at least one SS. As shown in processing block 112, there exists at least one D, and wherein the K is guided by the D. As shown in processing block 114 the K specifies, for any state in the SS, a probability that the stochastic walk will make a particular step in the SS, given the state the walk is currently at. Processing block 116 discloses K is automatically generated by an inference engine, while processing block 118 states K is deterministic, such that, given the state the walk is currently at, K assigns non-zero probability to only one particular step.

Processing continues with processing block 120 which recites at least one of the group comprising the SS, the D and the K is realized as nodes organized into one of a single rooted tree and a single rooted directed acyclic graph. As shown in processing block 122, the state space is denoted by an SS node consists of (i) any variables located directly at that node, combined with (ii) the state spaces denoted by each child of that SS node.

Processing block 124 discloses a value of the density denoted by a D node is a function of (i) any state space variables upon which the D node has a direct dependence, and (ii) the values of each child node of the D node. Processing block 126 states the direct dependence of the D node upon a state space variable is indicated by a graph edge from the D node to a node in the SS having the variable in its state space.

Processing block 128 recites density-to-density edges form one of a singly rooted tree and a singly rooted directed acyclic graph and wherein the root node of the graph represents a joint probability density function for an entire SS. As shown in processing block 130 K specifies, for any state in the SS, a probability that the stochastic walk will make a particular step in the SS, given the state the walk is currently at, and where the transition probability function for the K is a function of (i) any state space variables upon which the K node has a direct read-dependence, (ii) any densities upon which the K node has a direct dependence, and (iii) the transition probability function for each child node of the K node.

Processing continues with processing block 132 which discloses a direct read-dependence of the K node upon a state space variable is indicated by a read-type graph edge from the K node to a node in the SS having the variable in its state space. As further shown in processing block 134, the read-write-type graph edge acts as a read-type graph edge and a write-type graph edge.

Processing block 136 states the K must assign zero-probability to any step that changes the value of a variable upon which K does not have a write-dependency. Processing block 138 recites a write-dependence of the K node upon a state space variable is indicated by a write-type graph edge from the K node to a node in the SS having the variable in its state space.

Processing block 140 recites a direct dependence of the K node upon a density is indicated by a graph edge connecting the K node to the density node in the D graph. Alternately, as shown in processing block 142, every K node is assumed to have a direct dependence on the root node of the D graph.

In a particular embodiment, as shown in processing block 144, K implements a Markov chain Monte Carlo inference strategy for exploring the SS in accordance with a joint probability density function encoded by D.

Processing continues with processing block 146 which states providing a transformed model by an inference engine, the transformed model consisting of at least one state space SS, zero or more densities D, and at least one kernel K. As further shown in processing block 148, an inference engine, can further provide a functionally extended model consisting of at least one state space SS, zero or more densities D, and zero or more kernels K.

Processing block 150 recites providing one of a virtual machine (VM) and an interpreter for executing the stochastic walk through the at least one SS. IN this embodiment, as shown in processing block 152, the K is executed by the VM to determine a solution for the problem of interest. Further, as recited in processing block 154, the VM is capable of running on commodity hardware. Processing block 156 discloses the VM receiving input from at least one of an inference engine and a user.

Figure 3:
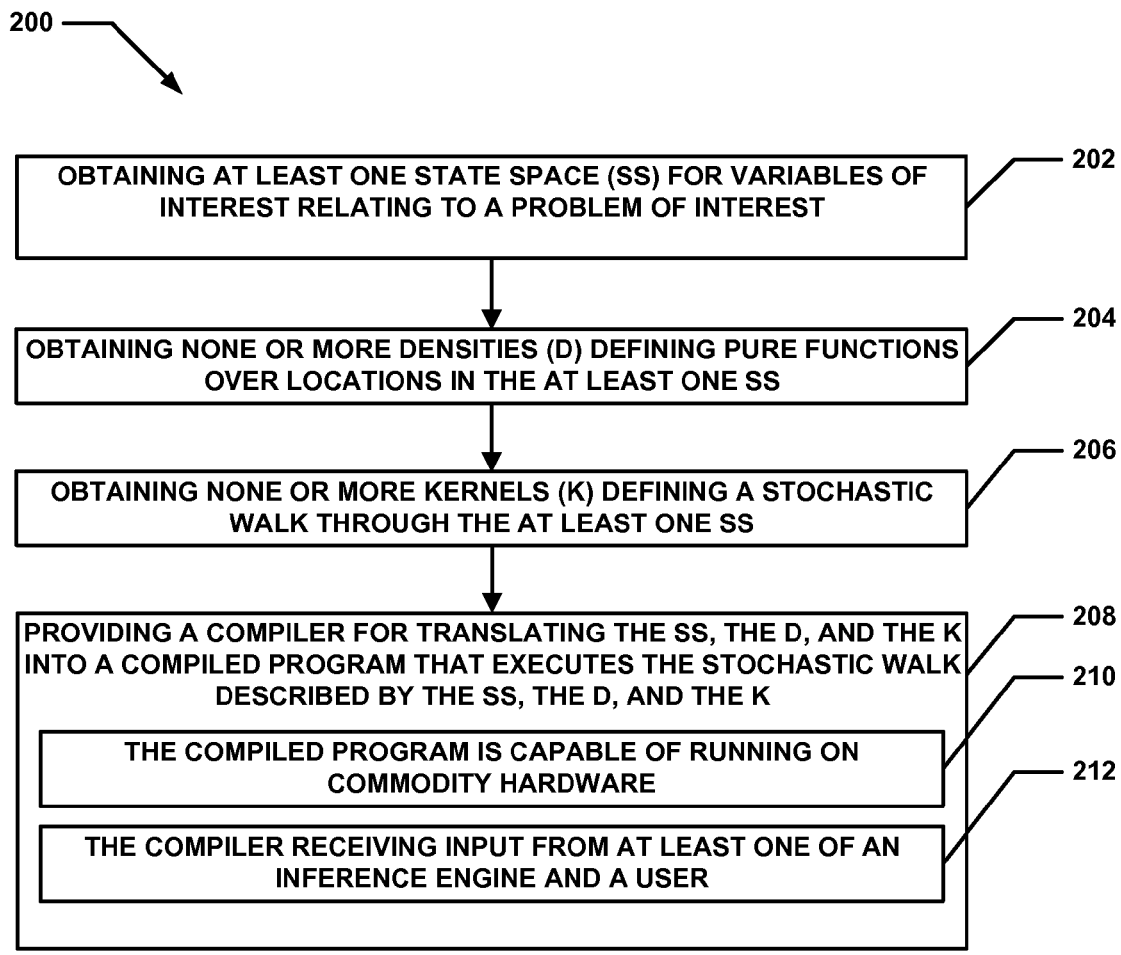
FIG. 3 depicts a flow diagram of another particular embodiment of a method of performing probabilistic inference and providing related solution methods in accordance with embodiments of the invention.

Referring now to FIG. 3, a particular embodiment of another method for providing a solution for a problem of interest is shown. Method 200 begins with processing block 202 which discloses obtaining at least one state space (SS) for variables of interest relating to a problem of interest. Processing block 204 states obtaining none or more densities (D) defining pure functions over locations in the at least one SS. Processing block 206 recites obtaining none or more kernels (K) defining a stochastic walk through the at least one SS.

Processing block 208 discloses providing a compiler for translating the SS, the D, and the K into a compiled program that executes the stochastic walk described by the SS, the D, and the K. As shown in processing block 210, the compiled program is capable of running on commodity hardware. As further shown in processing block 212 the compiler receives input from at least one of an inference engine and a user.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method for defining a structured stochastic automaton in which a computer system performs operations comprising:
    obtaining at least one state space (SS) for variables of interest relating to a problem of interest;
    obtaining one or more densities (D) defining pure functions over locations in said at least one SS;
    obtaining one or more kernels (K) defining a stochastic walk through said at least one SS; and
    providing a transformed model by an inference engine, said transformed model consisting of at least one state space SS, zero or more densities D, and at least one kernel K, and wherein said inference engine transforms the problem of interest to automatically provide an appropriate inference algorithm or restructures the existing problem of interest to be more efficient.

2. The method of claim 1 where D elements are used to describe at least one of fitness and a confidence measure of points in said SS.

3. The method of claim 2 wherein said problem of interest is a probabilistic model, and wherein D elements are used to describe a probability density function over the SS.

4. The method of claim 1 wherein there exists at least one D, and wherein said K is guided by said D.

5. The method of claim 1 wherein at least one of the group comprising said SS, said D and said K is realized as nodes organized into one of a single rooted tree and a single rooted directed acyclic graph.

6. The method of claim 5 wherein the state space denoted by an SS node consists of (i) any variables located directly at that node, combined with (ii) the state spaces denoted by each child of that SS node.

7. The method of claim 5 wherein a value of the density denoted by a D node is a function of (i) any state space variables upon which said D node has a direct dependence, and (ii) the values of each child node of said D node.

8. The method of claim 5 wherein the direct dependence of said D node upon a state space variable is indicated by a graph edge from said D node to a node in the SS having said variable in its state space.

9. The method of claim 5 wherein density-to-density edges form one of a singly rooted tree and a singly rooted directed acyclic graph and wherein the root node of said graph represents a joint probability density function for an entire SS.

10. The method of claim 1 wherein said K specifies, for any state in said SS, a probability that said stochastic walk will make a particular step in said SS, given the state said walk is currently at.

11. The method of claim 10 wherein said K is deterministic, such that, given the state said walk is currently at, K assigns non-zero probability to only one particular step.

12. The method of claim 5 wherein said K specifies, for any state in said SS, a probability that said stochastic walk will make a particular step in said SS, given the state said walk is currently at, and where the transition probability function for said K is a function of (i) any state space variables upon which said K node has a direct read-dependence, (ii) any densities upon which said K node has a direct dependence, and (iii) the transition probability function for each child node of said K node.

13. The method of claim 12 wherein a direct read-dependence of said K node upon a state space variable is indicated by a read-type graph edge from said K node to a node in the SS having said variable in its state space.

14. The method of claim 5 wherein said K must assign zero-probability to any step that changes the value of a variable upon which K does not have a write-dependency.

15. The method of claim 14 wherein a write-dependence of said K node upon a state space variable is indicated by a write-type graph edge from said K node to a node in the SS having said variable in its state space.

16. The method of claim 13 wherein a read-write-type graph edge acts as a read-type graph edge and a write-type graph edge.

17. The method of claim 12 wherein a direct dependence of said K node upon a density is indicated by a graph edge connecting said K node to said density node in the D graph.

18. The method of claim 12 wherein every K node is assumed to have a direct dependence on the root node of said D graph.

19. The method of claim 1 wherein K implements a Markov chain Monte Carlo inference strategy for exploring said SS in accordance with a joint probability density function encoded by D.

20. The method of claim 1 wherein said K is automatically generated by an inference engine.

21. The method of claim 1 further comprising providing, by an inference engine, an functionally extended model consisting of at least one state space SS, zero or more densities D, and zero or more kernels K.

22. The method of claim 1 further comprising providing one of a virtual machine (VM) and an interpreter for executing said stochastic walk through said at least one SS.

23. The method of claim 22 wherein said K is executed by said VM to determine a solution for said problem of interest.

24. The method of claim 22 wherein said VM is capable of running on commodity hardware.

25. The method of claim 22 further comprising said VM receiving input from at least one of an inference engine and a user.

26. A non-transitory computer readable medium having computer readable code thereon for defining a structured stochastic automaton, the medium comprising instructions in which a computer system performs operations comprising:
obtaining at least one state space (SS) for variables of interest relating to a problem of interest;
obtaining one or more densities (D) defining pure functions over locations in said at least one SS;
obtaining one or more kernels (K) defining a stochastic walk through said at least one SS; and
providing a transformed model by an inference engine, said transformed model consisting of at least one state space SS, zero or more densities D, and at least one kernel K, and wherein said inference engine transforms the problem of interest to automatically provide an appropriate inference algorithm or restructures the exiting problem of interest to be more efficient.

27. The computer readable medium of claim 26 further comprising instructions where D elements are used to describe at least one of a fitness and a confidence measure of points in said SS.

28. The computer readable medium of claim 27 further comprising instructions wherein said problem of interest is a probabilistic model, and wherein D elements are used to describe a probability density function over the SS.

29. The computer readable medium of claim 26 further comprising instructions wherein there exists at least one D, and wherein said K is guided by said D.

30. The computer readable medium of claim 26 further comprising instructions wherein at least one of the group comprising said SS, said D and said K is realized as nodes organized into one of a single rooted tree and a single rooted directed acyclic graph.

31. The computer readable medium of claim 30 further comprising instructions wherein the state space denoted by an SS node consists of (i) any variables located directly at that node, combined with (ii) the state spaces denoted by each child of that SS node.

32. The computer readable medium of claim 30 further comprising instructions wherein a value of the density denoted by a D node is a function of (i) any state space variables upon which said D node has a direct dependence, and (ii) the values of each child node of said D node.

33. The computer readable medium of claim 30 further comprising instructions wherein the direct dependence of said D node upon a state space variable is indicated by a graph edge from said D node to a node in the SS having said variable in its state space.

34. The computer readable medium of claim 30 further comprising instructions wherein density-to-density edges form one of a singly rooted tree and a singly rooted directed acyclic graph and wherein the root node of said graph represents a joint probability density function for an entire SS.

35. The computer readable medium of claim 26 further comprising instructions wherein said K specifies, for any state in said SS, a probability that said stochastic walk will make a particular step in said SS, given the state said walk is currently at.

36. The computer readable medium of claim 35 further comprising instructions wherein said K is deterministic, such that, given the state said walk is currently at, K assigns non-zero probability to only one particular step.

37. The computer readable medium of claim 30 further comprising instructions wherein said K specifies, for any state in said SS, a probability that said stochastic walk will make a particular step in said SS, given the state said walk is currently at, and where the transition probability function for said K is a function of (i) any state space variables upon which said K node has a direct read-dependence, (ii) any densities upon which said K node has a direct dependence, and (iii) the transition probability function for each child node of said K node.

38. The computer readable medium of claim 37 further comprising instructions wherein a direct read-dependence of said K node upon a state space variable is indicated by a read-type graph edge from said K node to a node in the SS having said variable in its state space.

39. The computer readable medium of claim 30 further comprising instructions wherein said K must assign zero-probability to any step that changes the value of a variable upon which K does not have a write-dependency.

40. The computer readable medium of claim 39 further comprising instructions wherein a write-dependence of said K node upon a state space variable is indicated by a write-type graph edge from said K node to a node in the SS having said variable in its state space.

41. The computer readable medium of claim 38 further comprising instructions wherein said read-write-type graph edge acts as a read-type graph edge and a write-type graph edge.

42. The computer readable medium of claim 37 further comprising instructions wherein a direct dependence of said K node upon a density is indicated by a graph edge connecting said K node to said density node in the D graph.

43. The computer readable medium of claim 37 further comprising instructions wherein every K node is assumed to have a direct dependence on the root node of said D graph.

44. The computer readable medium of claim 26 further comprising instructions wherein K implements a Markov chain Monte Carlo inference strategy for exploring said SS in accordance with a joint probability density function encoded by D.

45. The computer readable medium of claim 26 further comprising instructions wherein said K is executed by a virtual machine (VM) to determine a solution for said problem of interest.

46. The computer readable medium of claim 45 further comprising instructions wherein said VM is capable of running on commodity hardware.

47. The computer readable medium of claim 45 further comprising instructions for said VM receiving input from at least one of an inference engine and a user.

* * * * *